United States Patent [19]
Boyd et al.

[11] Patent Number: 5,336,878
[45] Date of Patent: Aug. 9, 1994

[54] VARIABLE SPEED SINGLE PASS COLOR OPTICAL SCANNER

[75] Inventors: David W. Boyd, Greeley; Greg A. Degi, Fort Collins, both of Colo.

[73] Assignee: Hewlett-Packard Company, Palo Alto, Calif.

[21] Appl. No.: 60,289

[22] Filed: May 10, 1993

[51] Int. Cl.⁵ .............................................. H01J 40/14
[52] U.S. Cl. ..................... 250/208.1; 358/514; 250/234
[58] Field of Search ............... 250/234, 208.1, 216, 250/226, 235; 358/497, 494, 473, 513, 514; 235/472

[56] References Cited

U.S. PATENT DOCUMENTS

| | | | |
|---|---|---|---|
| 4,160,279 | 7/1979 | Fuwa | 358/426 |
| 4,709,144 | 11/1987 | Vincent | 250/226 |
| 4,891,690 | 1/1990 | Hasegawa et al. | 358/514 |
| 4,926,041 | 5/1990 | Boyd et al. | 250/226 |
| 5,047,871 | 9/1991 | Meyer et al. | 358/486 |
| 5,182,450 | 1/1993 | Pan | 250/234 |

OTHER PUBLICATIONS

Takeuchi, R. et al. (1986) "Color Image Scanner with an RGB Linear Image Sensor," SPSE Conference, The Third International Congress on Advances in Non-Impact Printing Technologies, pp. 339–346 Aug. 1986.

*Primary Examiner*—Edward P. Westin
*Assistant Examiner*—T. Davenport

[57] ABSTRACT

A single pass color optical scanner which produces multiple color component images of a scan line region of a document at different times, but which is nevertheless capable of selective scaling of image data through adjustment of scanning speed.

14 Claims, 12 Drawing Sheets

|  | PIXEL 0 | PIXEL 1 | PIXEL 2 | PIXEL 3 |
|---|---|---|---|---|
| LINE 0 | R G B | R G B | R G B | R G B |
| LINE 1 | R G B | R G B | R G B | R G B |
| LINE 2 | R G B | R G B | R G B | R G B |
| LINE 3 | R G B | R G B | R G B | R G B |
| LINE 4 | R G B | R G B | R G B | R G B |
| LINE 5 | R G B | R G B | R G B | R G B |
| LINE 6 | R G B | R G B | R G B | R G B |

|        | PIXEL 0 | PIXEL 1 | PIXEL 2 | PIXEL 3 |
|--------|---------|---------|---------|---------|
| LINE 0 | R G B   | R G B   | R G B   | R G B   |
| LINE 1 | R G B   | R G B   | R G B   | R G B   |
| LINE 2 | R G B   | R G B   | R G B   | R G B   |
| LINE 3 | R G B   | R G B   | R G B   | R G B   |
| LINE 4 | R G B   | R G B   | R G B   | R G B   |
| LINE 5 | R G B   | R G B   | R G B   | R G B   |

FIG. 12

|        | PIXEL 0 | PIXEL 1 | PIXEL 2 | PIXEL 3 |
|--------|---------|---------|---------|---------|
| LINE 6 | R G B   | R G B   | R G B   | R G B   |
| LINE 1 | R G B   | R G B   | R G B   | R G B   |
| LINE 2 | R G B   | R G B   | R G B   | R G B   |
| LINE 3 | R G B   | R G B   | R G B   | R G B   |
| LINE 4 | R G B   | R G B   | R G B   | R G B   |
| LINE 5 | R G B   | R G B   | R G B   | R G B   |

FIG. 13

VARIABLE SPEED SINGLE PASS COLOR OPTICAL SCANNER

BACKGROUND OF THE INVENTION

The present invention relates generally to color optical scanners and, more particularly to variable speed, single pass color optical scanners which employ three line optical sensor arrays.

Color optical scanners are similar to black and white optical scanners in that data representative of a scanned document (object) is produced by projecting an image of the scanned document onto optical sensors. The optical sensors produce data signals representative of the intensity of the light impinged thereon. These data signals are typically digitized and stored on appropriate data storage media. Such stored data may later be used, as for example through a personal computer and computer monitor, to produce a display image of the scanned object. The image of the scanned object is projected onto the optical photosensor array incrementally by use of a moving scan line. The moving scan line is produced either by moving the document with respect to the scanner optical assembly or by moving the scanner optical assembly relative to the document.

Color optical scanners differ from black and white scanners in that multiple color component images of an object must be collected and stored to produce a color display image of the object. Typically data representative of red, green and blue component color images of the scanned object are produced and correlated for storage.

Various techniques are used in color optical scanners for collecting data representative of multiple component color images. One technique is to project imaging light onto a single linear sensor array during multiple scanning passes using differently colored illumination sources. For example a document is first scanned using only red light, then only green light and finally only blue light. In a variation of this technique three scanning passes are made using a white light illumination source but the imaging light is filtered before it enters the sensor array with a different color filter during each of the three passes.

Another technique, such as described in Vincent, U.S. Pat. No. 4,709,144 and Boyd, et al., U.S. Pat. No. 4,926,041, which are both hereby specifically incorporated by reference for all that is disclosed therein, is to split a polychromatic scan line light beam into multiple color component beams which are projected onto multiple linear photosensor arrays. For example an imaging beam from the same narrow scan line region of a document is split into red, green and blue component beams which are then simultaneously projected onto separate linear photosensor arrays. Using this technique the component color image data generated from any particular scan line is generated simultaneously and is thus easily stored in a correlated form.

Yet another technique for generating multiple color component images from a polychromatic light beam is to simultaneously project light from different scan line regions of a document onto separate linear photosensor arrays such as described in Takeuchi, R. et al. (1986) "Color Image Scanner with an RGB Linear Image Sensor," SPSE Conference, The Third International Congress On Advances in Non-Impact Printing Technologies, PP339-346, August 1986, which is hereby specifically incorporated by reference for all that it discloses. Using this technique it is necessary to perform data manipulation to correlate the data representative of different scan line component images since the different component color images of any scan line region of the document are generated at different times.

Various types of photosensor devices may be used in optical scanners. Currently the most commonly used photosensor device for optical scanners is the charge coupled photosensor device or "CCD". A CCD builds up an electrical charge in response to exposure to light. The size of the electrical charge built up is dependent on the intensity and the duration of the light exposure.

In optical scanners CCD cells are aligned in linear arrays. Each cell or "pixel" has a portion of a scan line image impinged thereon as the scan line sweeps across the scanned object. The charge built up in each of the pixels is measured and then discharged at regular "sampling intervals". In most modern optical scanners the sampling intervals of the CCD arrays are fixed. A typical CCD sampling interval is 4.5 milliseconds.

As previously mentioned an image of a scan line portion of a document is projected onto the scanners linear sensor array by scanner optics. The scanner optics comprise an imaging lens which typically reduces the size of the projected image from the original size of the document considerably, e.g. by a ratio of 7.9:1. Pixels in a scanner linear photosensor array are aligned in a "cross" direction, i.e. a direction parallel to the longitudinal axis of the scan line image which is projected thereon and perpendicular to the direction of movement of the scan line across the object. The direction perpendicular to the "cross" direction and parallel to scan line movement on the object will be referred to herein as the "scan" direction. Each pixel has a "length" measured in the cross direction and a "width" measured in the scan direction. In most CCD arrays the length and width of the pixels are equal, e.g. 8 microns in each dimension. The "line width" of a linear CCD array is the same as the width of each of the individual pixels in the array.

At any instant when an object is being scanned, each pixel in the CCD array has a corresponding area on the object which is being imaged thereon. This corresponding area on the scanned object will be referred to herein as a "native object pixel" or "native pixel". A native object pixel has dimensions equal to the dimensions of the corresponding pixel on the linear photosensor array multiplied by the magnification ratio of the scanner imaging lens.

Scanners are typically operated at a scan line sweep rate such that one native object pixel width is traversed during each CCD sampling interval. However it has been discovered, as disclosed in Meyer et al., U.S. Pat. No. 5,047,871 which is hereby specifically incorporated by reference for all that it discloses, that the resolution of a display image produced with data generated by some scanners, and thus the size of the display image, may be controlled by controlling the scan line sweep rate of the scanner. For example, by increasing the scan line sweep speed from one scan line per CCD interval to two scan lines per CCD interval, the CCD "sees" two scan line widths of the scanned document during a single sensing interval. As a result, a display image produced from the CCD data signal of the faster scan speed is one-half the size of a display image produced from a CCD signal generated at the slower scan speed. Describing this phenomena in different words, the increased scan speed results in an effective increase in the width of object pixels. A scan speed of two scan lines per CCD interval results in "effective object pixels" which are twice the width of native object pixels. The ability to "scale" the image produced by a display device by controlling scanner sweep speed is a significant feature which is offered on many newer scanners.

The color optical scanner described in the Takeuchi paper operates much more quickly than multiple pass color optical scanners. Sizing of display images was achieved through use of a zoom lens assembly. However, such a lens assembly adds considerably to the cost of an optical scanner. If the scanner of the Takeuchi paper were operated at scanning speeds different from the one set speed of the scanner in an attempt to achieve image scaling, the resulting data would be scrambled and unusable.

SUMMARY OF THE INVENTION

The present invention provides a single pass color optical scanner which produces multiple color component images of a scan line region of a document at different times but which is nevertheless capable of selective scaling of image data through adjustment of scanning speed.

Thus, the present invention may comprise an optical scanner device for producing machine readable data representative of a color image of a scanned object. The optical scanner device includes a light source for illuminating the scanned object and an imaging assembly for focusing imaging light from an aligned portion of the object onto an image region which is located to coincide with the surface of a photosensor assembly. The imaging assembly thus provides an image of the currently aligned portion of the object at the image region.

The photosensor assembly operates in successive sampling intervals and generates image data, initially in a scrambled form, which is representative of a color image of the object once it is unscrambled. The photosensor assembly includes a plurality of linear photosensor arrays which each have the same photosensor line width. The linear photosensor arrays are positioned in parallel alignment and each photosensor array is covered with a different color filter. In one embodiment of the invention, there are three linear photosensor arrays covered by red, green and blue filters, respectively. Thus, the first linear photosensor array receives only red light, the second photosensor array receives only green light, and the third photosensor array receives only blue light.

The optical scanner includes a displacement assembly for producing relative displacement between an object which is being scanned and the scanner imaging assembly. The displacement assembly enables a sweeping scan image of the object to be produced on the image region containing the linear photosensor arrays.

The optical scanner device also includes a means for selecting different scan speeds for the displacement assembly. The scan speed selection assembly produces a scan speed signal which is indicative of the selected scan speed.

A data processing assembly is provided which receives and processes the data signal from the linear photosensor arrays and the scan speed signal. The data processing assembly uses the scan speed signal for correlating data from the linear photosensor arrays such that the correlated data from the different sensors is representative of the intensity of light from the same general location on the scanned object, regardless of the scan speed which is selected. As a result, the correlated data signal may be used to produce an accurate display image of the object no matter what scanning speed (scaling factor) is selected.

BRIEF DESCRIPTION OF THE DRAWING

An illustrative and presently preferred embodiment of the invention is shown in the accompanying drawing in which:

FIG. 10 is a schematic representation of the manner in which red, green and blue imaging data from an optical scanner device are initially stored in a computer file;

FIG. 11 is a representation of the manner in which imaging data may be stored in a computer file after the original imaging data is rearranged;

FIG. 12 represents a computer memory area which serves as a circular buffer and which is provided with data representing one point in time of scanner operation;

FIG. 13 is a representation of the circular buffer of FIG. 12 at a second point in time;

DESCRIPTION OF THE APPENDIX

Appendix A is a copy of source code which illustrates one specific manner for implementing the control operations described in the specification by use of computer software.

DETAILED DESCRIPTION OF THE INVENTION

Figure 6:
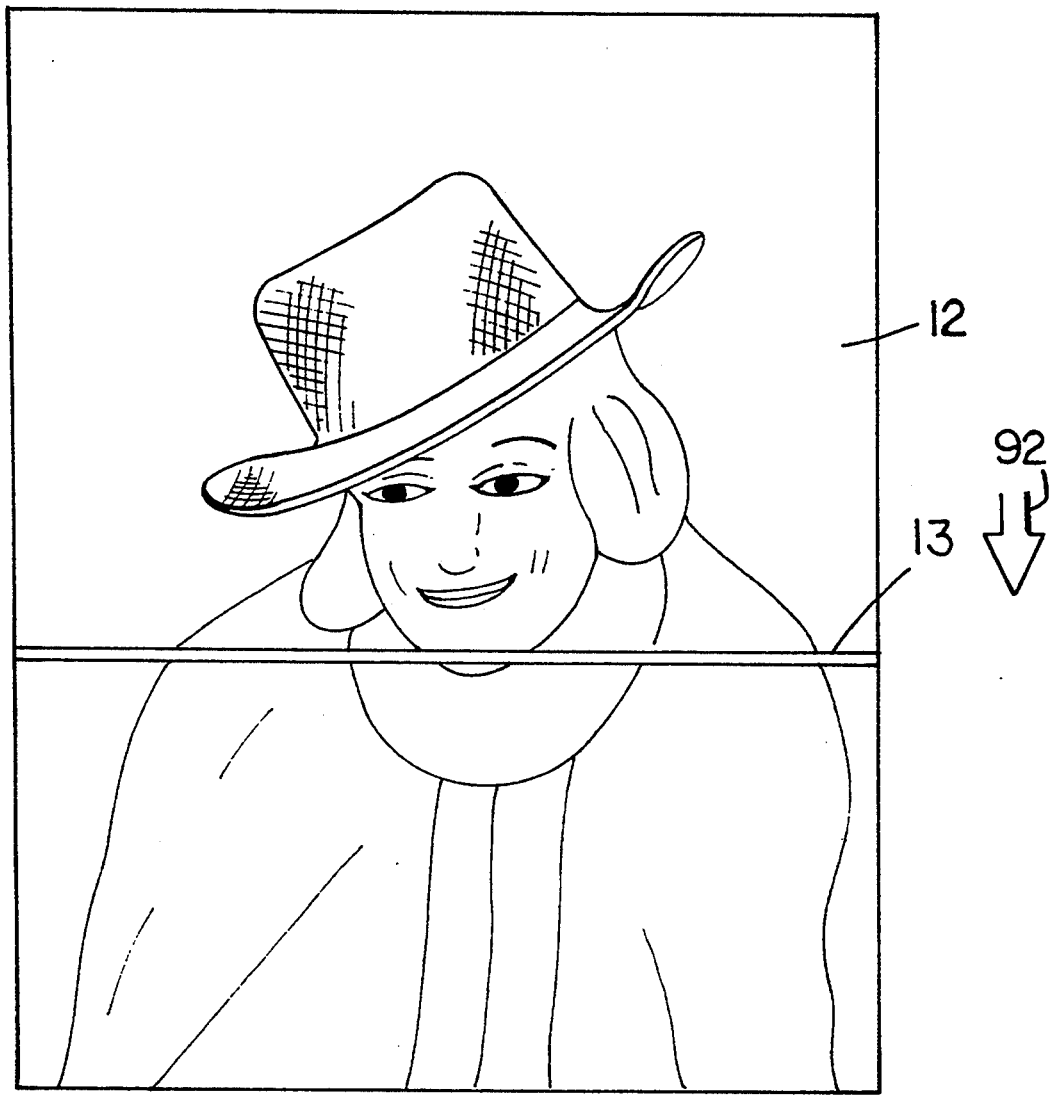
FIG. 6 is a plan view of a document which is being scanned by an optical scanner device which illustrates the movement of a scan line across the document.

FIGS. 1-3 and 7 illustrate an optical scanner device 10 which is adapted for producing machine readable data representative of a color image of a scanned object 12 such as a sheet of paper with graphics provided thereon as illustrated in FIG. 6. The object 12 which is to be scanned may be supported on a transparent plate portion 14 on the upper panel of the scanner device. The scanner device includes a light source assembly 16 for illuminating object 12 and also includes an imaging assembly 18 (shown schematically in FIG. 7) for focusing imaging light from an aligned portion 90 of the object 12 onto an image region 22 of a photosensor assembly 20 so as to provide an image 11, FIG. 4, of the aligned portion of the object at the image region.

Figure 4:
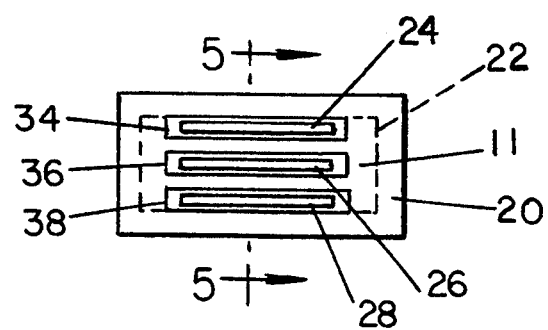
FIG. 4 is a plan view of a photosensor assembly employed in the optical scanner device of FIGS. 1-3.
Figure 5:
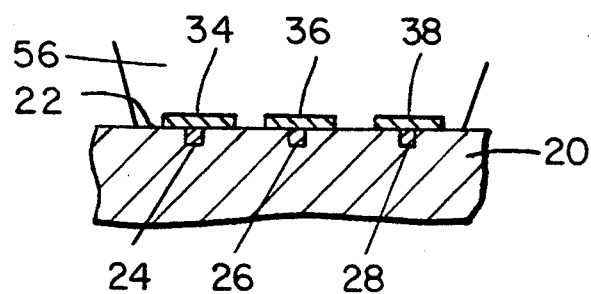
FIG. 5 is a cross-sectional elevation view of the photosensor assembly of FIG. 4.

The photosensor assembly 20 of the scanner device operates in successive sampling intervals and generates image data representative of a color image of the object 12, which is initially in a scrambled form. The photosensor assembly may be a three line CCD photosensor unit. As illustrated by FIGS. 4 and 5, the photosensor assembly 20 includes a first linear photosensor 24 having a predetermined photosensor line width (pixel width), e.g. 8 microns (0.000315 inches), which is located in image region 22 (which in one preferred embodiment is an image plane) and which generates a first data signal representative of the intensity of imaging light which is impinged thereon. A second linear photosensor 26, having the same predetermined width as the first photosensor, is also located in image region 22. The second linear photosensor is positioned parallel to the first linear photosensor 24 and is spaced therefrom by a photosensor gap distance 30, FIG. 7, which is measured between the center lines of the photosensors 24, 26. The photosensor assembly 20 may be limited to two linear photosensors or may include three, four or more photosensors without departing from the invention. However, in most optical scanners three photosensors are employed to detect light in the three primary colors -red, green and blue- and thus an embodiment of the invention specifically describing a three line photosensor implementation is specifically described herein. In such an embodiment, the third photosensor 28 is positioned parallel to the first and second photosensors and has the same line width as the first and second photosensors. The third linear photosensor 28 is positioned in image region 22 parallel to the first two photosensors and is spaced apart from the second linear photosensor 26 by a second photosensor gap distance 32, FIG. 7, as measured between photosensor 26 and 28 centerlines. First, second and third color filters 34, 36, 38 are operably associated with the first, second and third linear photosensors 24, 26, 28, respectively, for filtering imaging light focused on the linear photosensors such that the first linear photosensor 24 receives only light of a first preselected color, e.g. red, the second linear photosensor receives only light of a second selected color, e.g. green, and the third linear photosensor receives only light of a third preselected color, e.g. blue. The photosensor assembly 20 and associated filters 34, 36, 38 may be of a type identical to that described in detail in U.S. patent application, Ser. No. 869,273, of Michael John Steinle and Steven Lawrance Webb for COLOR IMAGE SENSING ASSEMBLY WITH MULTIPLE LINEAR SENSORS AND ALIGNED FILTERS filed Apr. 15, 1992, now abandoned (May 19, 1993), which is hereby specifically incorporated by reference for all that it discloses.

Figure 2:
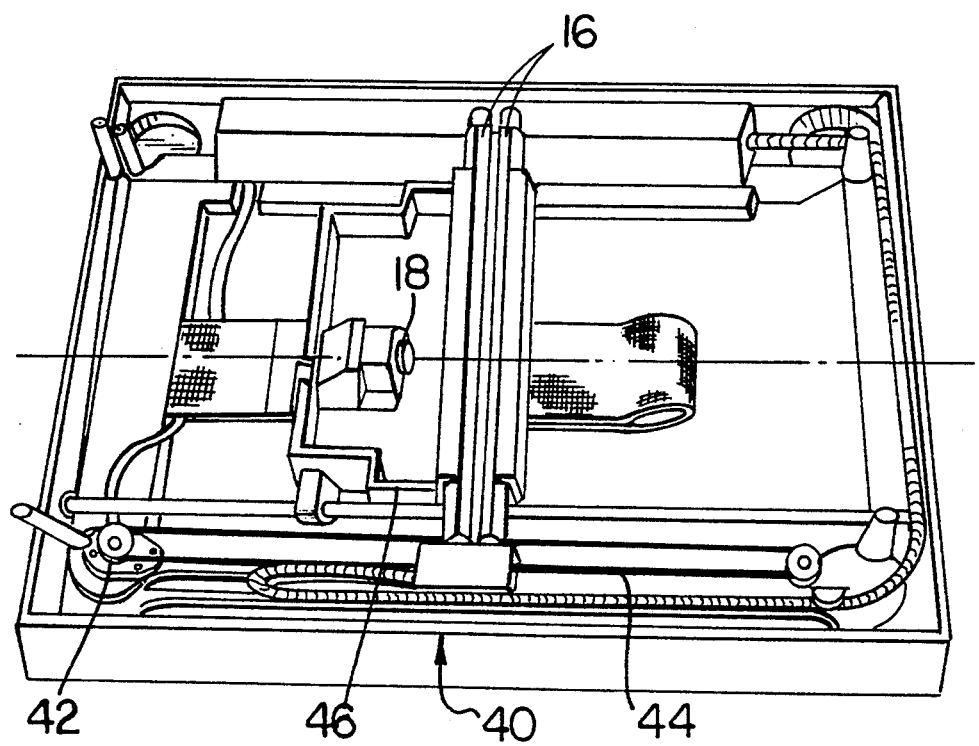
FIG. 2 is a perspective view of the optical scanner device of FIG. 1 with the top panel removed.
Figure 3:
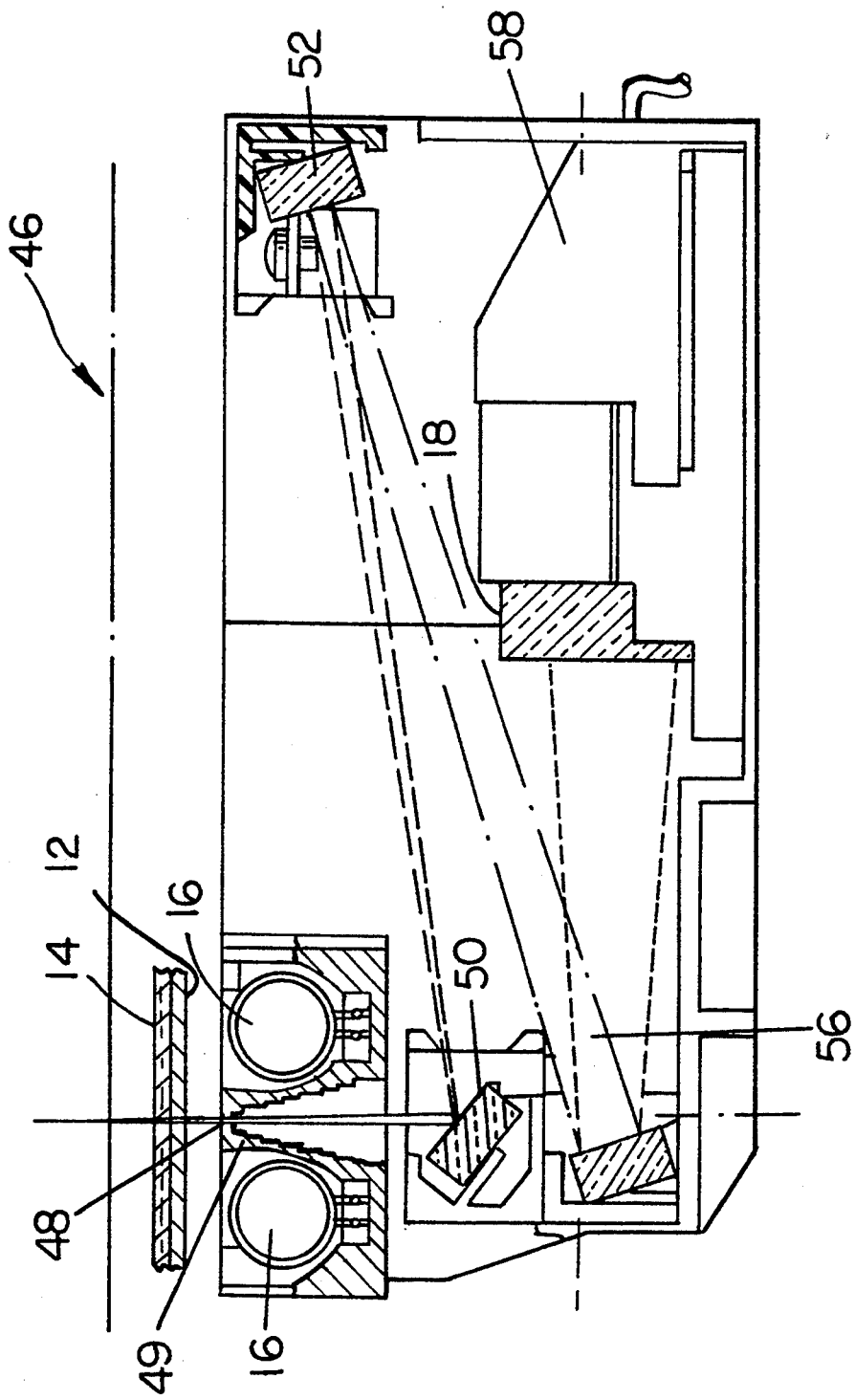
FIG. 3 is a cross-sectional elevation view of a carriage portion of the optical scanner device of FIGS. 1 and 2.

The optical scanner device 10 may include a displacement assembly 40, FIG. 2, which includes a drive motor 42, a drive belt 44 and a carriage assembly 46.

The carriage assembly 46 may support light source 16, imaging assembly 18 and photosensor assembly 20 therewithin. The carriage assembly 46 also supports a light slit 48 defining structure 49. The light slit defining structure 49 may also support the light source 16 which may comprise a pair of fluorescent bulbs. The light slit 48 is sufficiently wide to provide an image 11 at image region 22 which encompasses all three linear photosensors. A plurality of mirrors 50, 52, 54 may also be provided within the carriage assembly so as to provide a folded light path 56 extending from the currently scanned portion 13, FIG. 6, of the object 12; through the light slit 48; thence from mirror 50 to mirror 52 to mirror 54, and thence, through imaging assembly 18 to photosensor assembly 20. Photosensor assembly 20 may be provided within a shroud member 58 supported by the carriage assembly 46.

The carriage assembly 46 is displaced relative to transparent plate 14, and the object 12 supported thereon, to produce a sweeping scan image of the object at the image region 22. Except for the fact that the width of the light slit 48 must be sufficiently wide to provide an image which encompasses all three photosensors and except for the fact that the arrangement of optics which are optically downstream from the imaging assembly 18 is different, the physical structure of the optical scanner device 10, as heretofore described, may be similar or identical to the optical scanner described in U.S. Pat. No. 4,926,041 of Boyd et al. which is incorporated by reference above.

Figure 1:
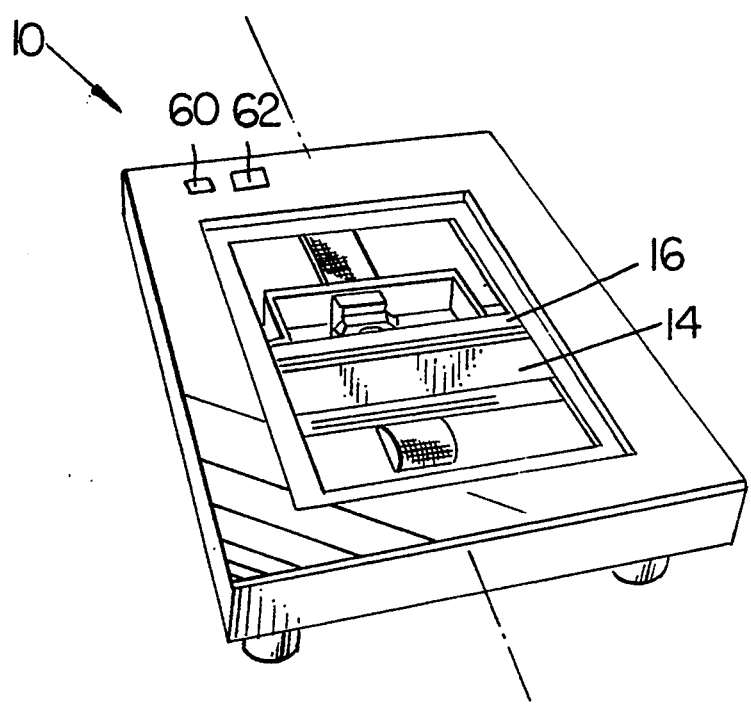
FIG. 1 is a perspective view of an optical scanner device.

As illustrated in FIG. 1, the optical scanner device includes a scan speed selector 60 which may be a conventional pushbutton selector, and a scan speed selection display 62 which may be a conventional LCD display. In the alternative, the scan speed selector and display may be provided through the use of appropriate software installed on an operably connected personal computer 64, FIG. 8, having a display 66, such as a conventional CRT display, and having storage media such as a conventional hard disk. In the embodiment shown in FIG. 1, the scan speed selector 60 provides a signal indicative of the scan speed which is selected.

Figure 8:
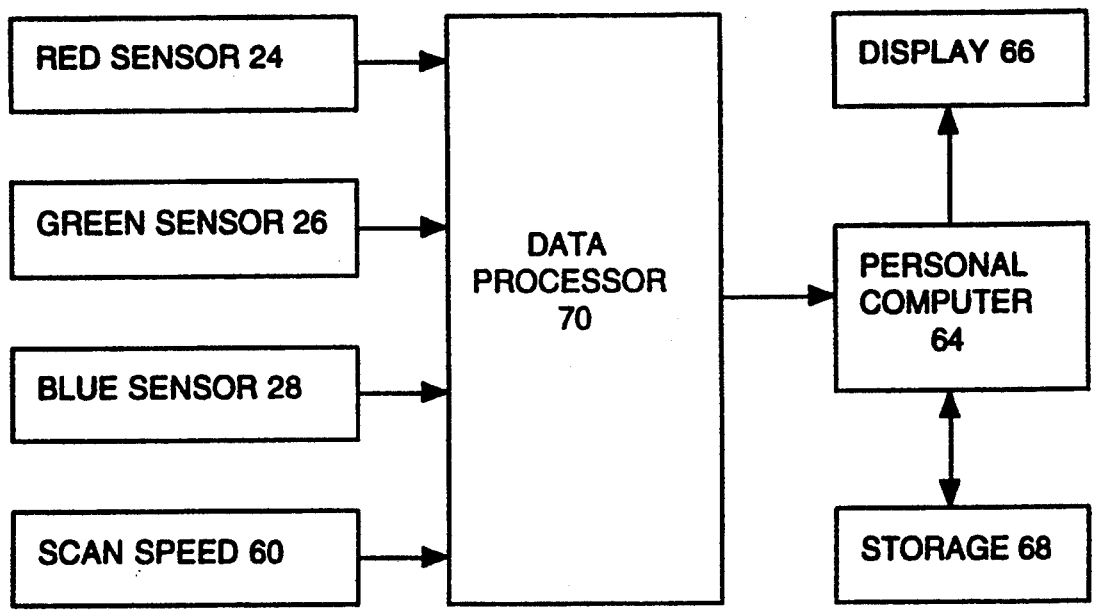
FIG. 8 is a block diagram illustrating the primary inputs and output of a data processor which is used to correlate image data.

The optical scanner device 10 comprises a data processing assembly 70 which is responsive to the scan speed signal for correlating data from the first, second and third data signals such that the correlated data is representative of the intensity of light from the same general location on the scanned object 12 regardless of the selected scan speed. The basic inputs and output of the data processor assembly 70 may be as illustrated in FIG. 8.

Figure 7:
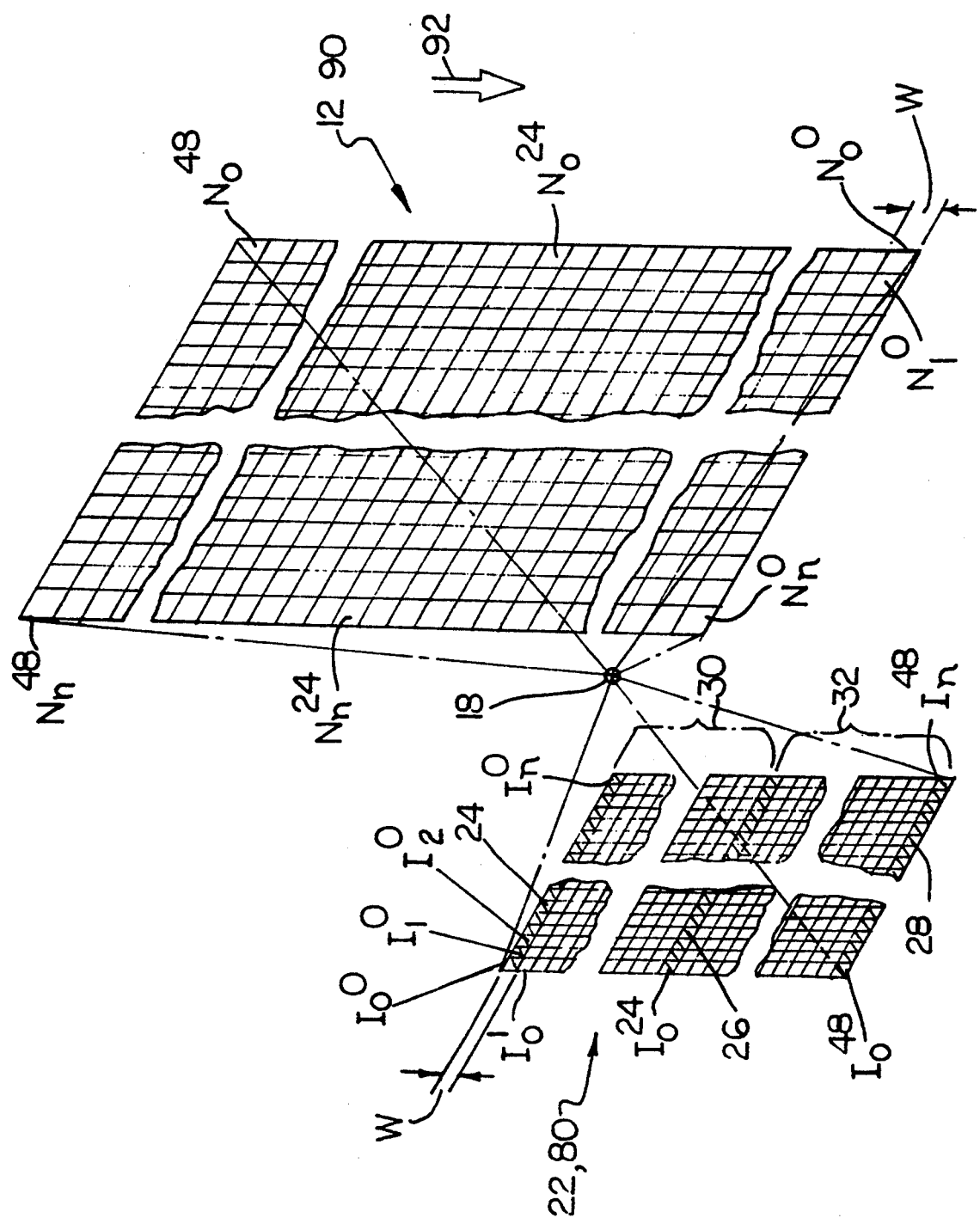
FIG. 7 is a schematic illustration of the image region associated with a three line photosensor assembly and a corresponding portion of a scanned object, each divided into a pixel-sized gridwork.

FIG. 7 is a schematic representation showing the portion 80 of image region 22 which is bounded by first, second and third linear sensor arrays 24, 26 and 28. FIG. 7 also shows the area 90 of scan object 12 which corresponds to image region portion 80. For purposes of illustration, image region portion 80 is represented as an image plane pixel-sized gridwork designated $I^0_0$–$I^{48}_n$ with pixel rows indicated by superscript and pixel columns indicated by subscript. Thus, linear photosensor array 24 which is n pixels long contains pixels $I^0_0$ to $I^0_n$, and is one (image) scan line width "w" wide. The scan line in image reading portion 80 adjacent to the above described scan line is the scan line represented by pixels $O^1_0$ to $I^1_n$. The second linear photosensor array 26 contains pixels $I^{24}_0$ to $I^{24}_n$ and the third linear photosensor array 28 contains pixels $I^{48}_0$ to $I^{48}_n$.

As further shown by FIG. 7, a portion 90 of the scanned object which corresponds to image region portion 80 may be divided into a gridwork of "native pixels" with each native pixel being represented by the letter "N" with superscripts and subscripts. The superscript and subscript indicated for each native pixel "N" corresponds to the superscript and subscript of the associated image pixel in image region portion 80 i.e., $I^0_0$ corresponds to $N^0_0$, $I^{48}_n$ corresponds to $N^{48}_n$, etc. The direction in which the scanned object 12 is moved with respect to the imaging assembly 18 is indicated by arrow 92. Thus, a scanner displacement of one native pixel, i.e., one native scan line width, would move the native scan line on the object represented by pixels $N^{48}_0$ through $N^{48}_n$ down one native scan line width to the position presently occupied by $N^{47}_0$ through $N^{47}_n$ with a corresponding displacement of image pixels in the image region portion 80.

FIG. 7 demonstrates that at any particular point in time during a scanning operation the object scan line, e.g. $N^0_0$ through $N^0_n$, projected onto the first linear photosensor array 24 is a different scan line from the scan line, e g. $N^{24}_0$ to $N^{24}_n$ which is projected onto the second linear photosensor array 26 which is, in turn, different from the scan line, e g. $N^{48}_0$ to $N^{48}_0$, which is projected onto the third linear photosensor array 28. These three native pixel scan lines $N^0_0$–$N^0_n$, $N^{24}_0$–$N^{24}_n$ and $N^{48}_0$–$N^{48}_n$ are separated from one another by a distance on the object plane which corresponds to gap distances 30 and 32 between photosensors on the image plane 22. Each native pixel scan line has a width "W" corresponding to image scan line width "w", i.e. w=WX (Lens Reduction Ratio).

With further reference to FIG. 7, it will be appreciated that if scanner displacement in direction 92 takes place at a rate of 1 native pixel scan line width per photosensor operating interval, that the light which is projected onto each linear photosensor during a sampling interval will, in general, represent information from one native scan line on the object. It will also be appreciated that if the scan speed is increased (while the sampling interval remains constant), light from more than one native pixel scan line will be imaged on each photosensor during a sampling interval. For example, at a scan speed at a rate of three object pixel scan lines per photosensor interval, imaging light from three adjacent native scan lines will be impinged on a linear photosensor during a single photosensor interval. As a result, the output of the linear photosensor at the end of the operating interval will be representative of an average of the three adjacent scan lines. It is useful for conceptual purposes to consider the number of native scan lines which are traversed during a photosensor operating interval to represent a single "effective" object scan line. Thus, for example, at a scanning speed eight times faster than a rate of one scan line per operating interval, the effective scan line width on the object plane on the corresponding effective scan line width on the image plane is equal to eight regular, i.e., native pixel, scan line widths because the sensor "sees" eight native scan lines during each photosensor operating interval. Thus, in the embodiment illustrated in FIG. 7, where linear photosensor 24 is separated from sensor 26 by an offset gap of 24 ordinary scan line widths, it is separated by a gap of three "effective" scan line widths when the scanning speed is eight regular scan line widths per photosensor interval.

The task performed by the data processor 70, FIG. 8, is to correlate data from each of the linear photosensor arrays 24, 26, 28 by grouping data from each linear photosensor array with data from the other linear photosensor arrays which come from the same "effective scan line" portion of the document. The grouping of data from the different linear photosensors in this manner is based upon a determination of the number of effective scan lines in the offsets 30, 32 between scan lines as will be further discussed below.

Certain terms used to explain the operation of the data processor 70 will now be defined. As used herein, the phrase "reference-line-number value" means the value of a gap distance 30 or 32 divided by the width "w" of a single image plane native pixel/scan line. The "reference-line-number value" thus represents the number of ordinary scan line widths between a pair of photosensors, e.g., first and second photosensors 24, 26.

The phrase "reference-scan-speed value" means a scan speed at which an image on the image region 80 moves one photosensor line width per photosensor sampling interval.

The phrase "sampling-interval-offset-number" means reference-scan-speed value divided by actual scan speed and then multiplied by reference-line-number value. It will be seen from the above definitions that the sampling-interval-offset number represents the number of "effective scan line widths" between the centerlines of two linear photosensor arrays, e.g. 24 and 26.

Figure 9A:
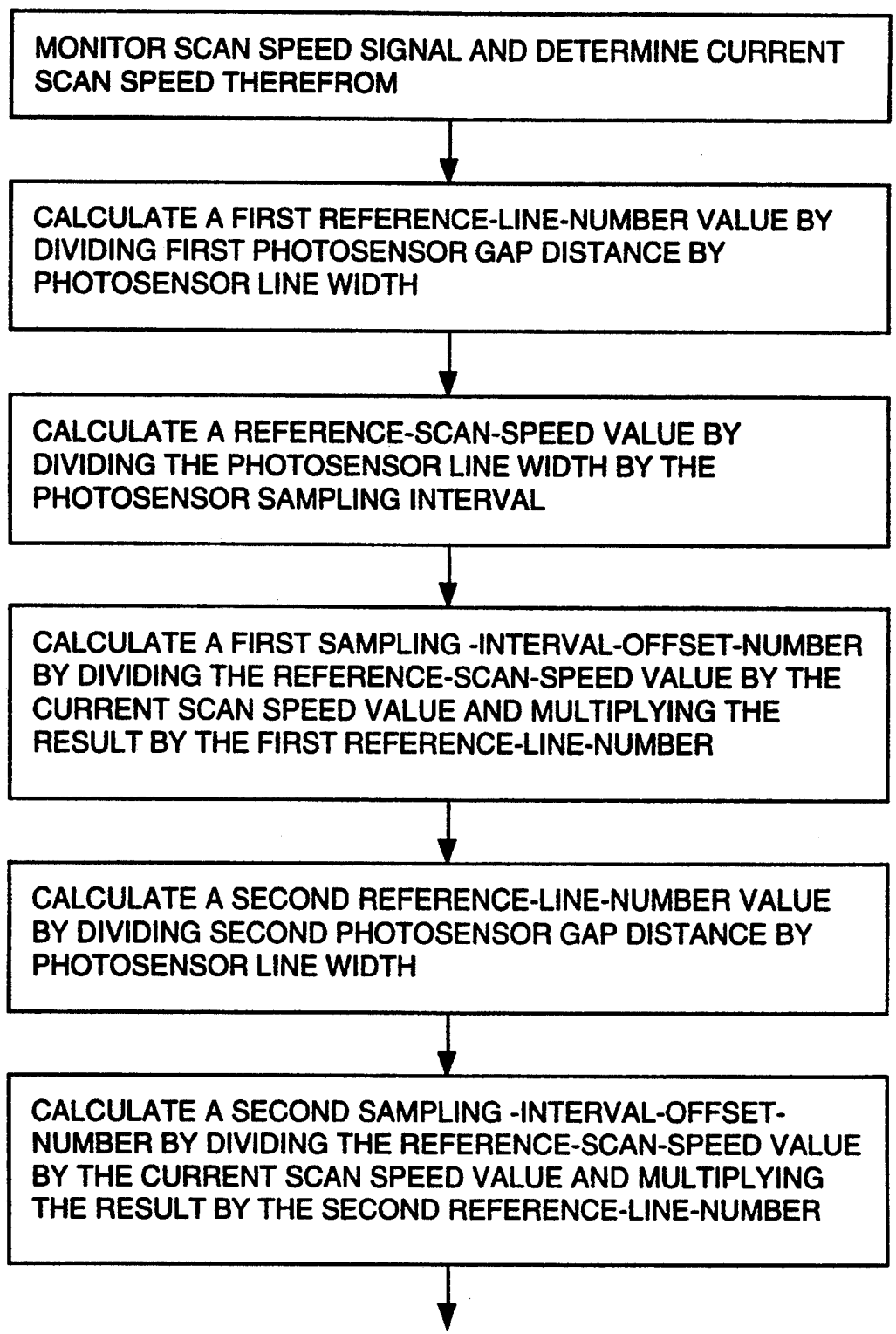
FIG. 9A is a first portion of a block diagram illustrating the basic operations performed by the data processor of FIG. 8.
Figure 9B:
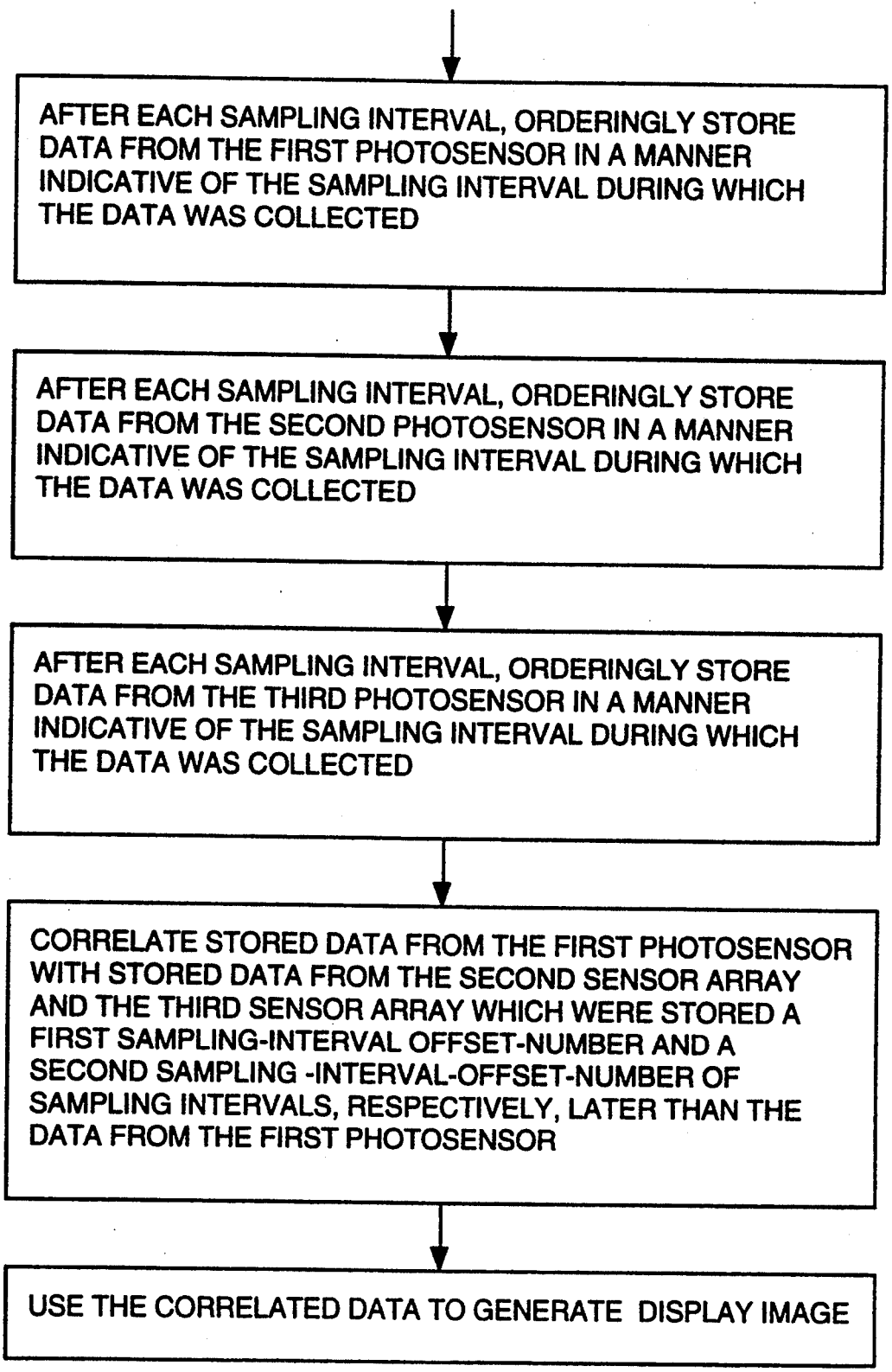
FIG. 9B is a second portion of a block diagram, the first portion of which is shown in FIG. 9A.

The general manner in which data processor 70 processes photosensor signals and scan speed in order to produce a correlated data image signal is illustrated by FIG. 9. The data processor 70 continuously monitors the scan speed signal and determines the current operating speed of the scanner therefrom. The data processor then calculates a first reference-line-number value by dividing the first photosensor gap distance 30 by the photosensor line width "w". The data processor next calculates a reference-scan-speed value by dividing the photosensor line width "w" by the photosensor sampling interval. Next, the data processor calculates a first sampling-interval-offset number by dividing the reference-scan-speed value by the current scan speed value and multiplies the result by the first reference-line-number. Any non-integer value is rounded to the nearest integer. (Thus, the maximum misregistration of color is one-half effective scan line width. Alternatively, the speed selector may be set to allow only integer values of speed choice/scaling, in which case no color registration error is induced by the control algorithm.) Next, the data processor calculates a second reference-line-number by dividing the second photosensor gap distance 32 by the photosensor line width "w". Next, a second sampling-interval-offset number is calculated by dividing the reference-scan-speed value by the current scan speed value and multiplying the result by the second reference-line-number. Again, Rounding is applied if necessary, as described above.

As further illustrated by FIG. 9, after each sampling interval the data processor stores data from the first sensor array in a manner indicative of the sampling interval during which the data was collected and also performs the same function with respect to data from the second and third sensor array. The data processor correlates the stored data from the first sensor array with stored data from the second sensor array which was stored a first sampling-interval-offset-number later than the data from the first sensor array. This correlated data from the first and second sensor arrays is further correlated with data from the third sensor array that was stored a first plus a second-sampling-interval-offset-number of sampling intervals later than the data from the first sensor array.

Thus, a correlated data signal is provided which is representative of an accurate color image of the scanned object 12. This data signal is typically used to generate a display image of the object and/or is stored in an appropriate computer image file format for subsequent use in creating a display image of the object.

Having thus described the operation of the data processor 70 in general terms, a specific description of a manner of implementing this methodology in computer software will now be described.

Software Implementation

The scanner and associated software may create a computer file with image data from the three sensors 24, 26, 28 such as illustrated in FIG. 10. In the illustration of FIG. 10 each R represents data from the red sensing photosensor 24, G represents data from the green sensing photosensor 26 and B represents data from the blue sensing photosensor 28. Each line number is indicative of the information from an "effective" scan line (as opposed to a native scan line). The RGB components in each of the cells illustrated in FIG. 10 come from a different location on the scanned object. For example, if the scanner is operated at a scan speed such that the offset number is 3, then the blue component from effective scan line 0, pixel 0 is actually associated with the green component from line 3, pixel 0 and the red component from line 6, pixel 0 as illustrated by circling of these components in FIG. 10.

What must be done at this point is to shuffle the data in the file so that the RGB components associated with a particular location on the object are stored together.

In one embodiment, the algorithm which sorts the RGB components stored in the manner shown in FIG. 10 initially separates the components into different planes. This separation may be represented as shown in FIG. 11. In such an embodiment, each plane may be written to a separate data file.

An example in which the offset number between the red and green photosensors 24, 26 is 3 and in which the offset number between the green and blue photosensors 26, 28 is also 3, will be used to demonstrate how the color plane storage described above is achieved. First, memory is allocated to store six complete lines of the original image. This allocated memory area will serve as a circular buffer. After reading the first six lines of the image file, the buffer (with uncorrelated data) will look as indicated in FIG. 12.

Next, all the red pixels are read from the line 0 (in the circular buffer) and sent to the red file. Then the green pixels are read from line 3 and sent to the green file. Since line 0 is completed, it is now possible to read line 6 of the image file to the plane which line 0 occupied in the buffer. Then all the blue pixels are taken from line 6 of the image (which resides in line 0 of the buffer) and are sent to the blue file.

At this point, the buffer may be represented as illustrated in FIG. 13.

Next, the same techniques are used on the next rows of data:
1) Red pixels are read from line 1 to the red file.
2) Green pixels from line 4 to green file.
3) Read line 7 from image to area where line 1 was.
4) Blue pixels from line 7 of the image (which resides in line 1 of the buffer) to blue file.

And again:
1) Red pixels from line 2 to red file.
2) Green pixels from line 5 to green file.
3) Read line 8 over line 2.
4) Blue pixels from line 8 of the image (which resides in line 2 of the buffer) to blue file.

This same sequence of four steps is repeated as many times as there are effective scan lines in the original image file.

Since as explained above buffer lines are reused, modular arithmetic or other conventional techniques may be used to determine which lines of the circular buffer contain the red, green and blue pixels of the current image line. Source code for the above described software implementation is attached hereto as Appendix A and forms a portion of this disclosure for all that is disclosed therein.

Hardware Implementation

Figure 14:
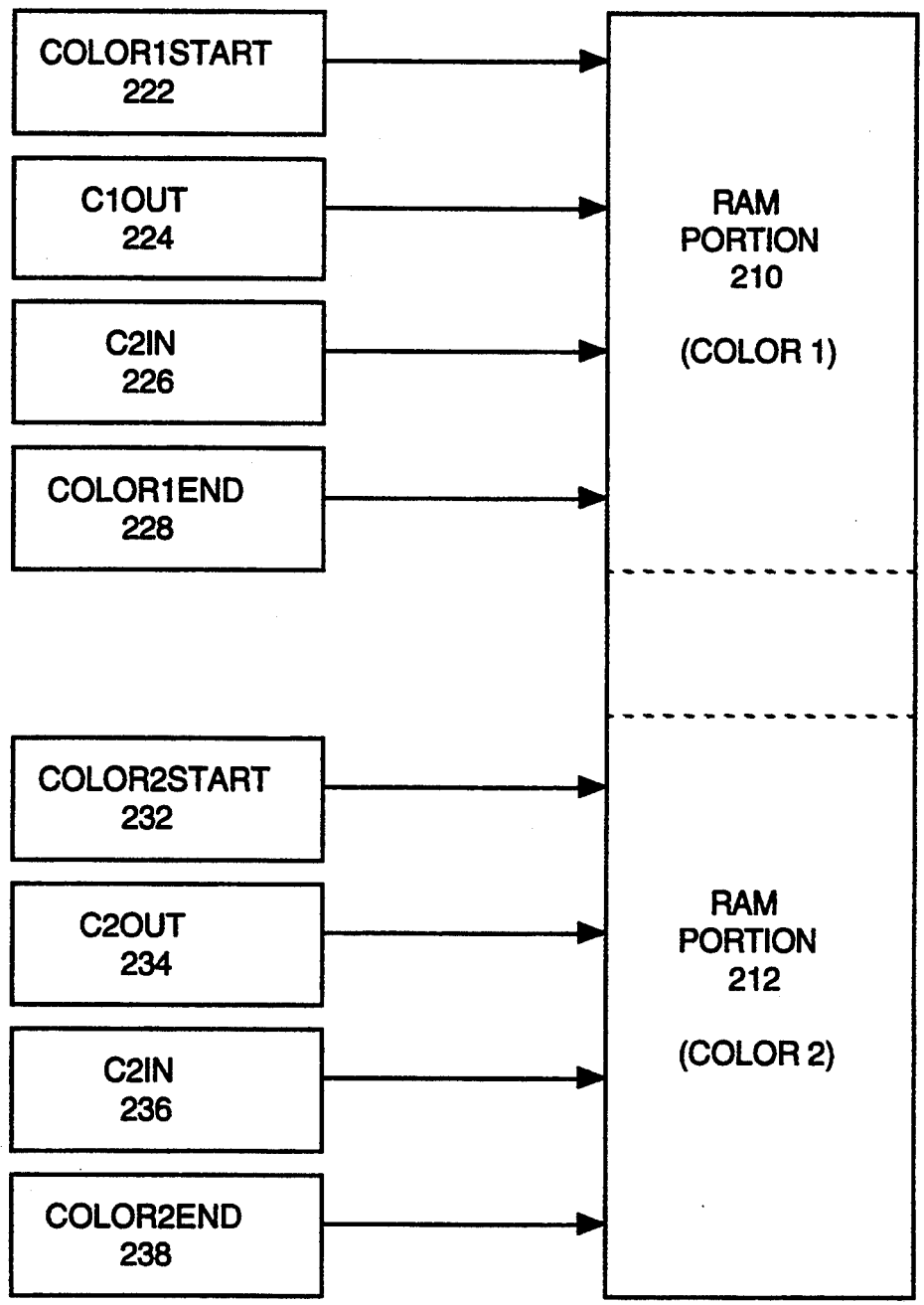
FIG. 14 is a schematic illustration of the general manner in which color component data from the three linear photosensors 24, 26, 28 are input, stored and output from random access memory (RAM) of a data processor 70.
Figure 15:
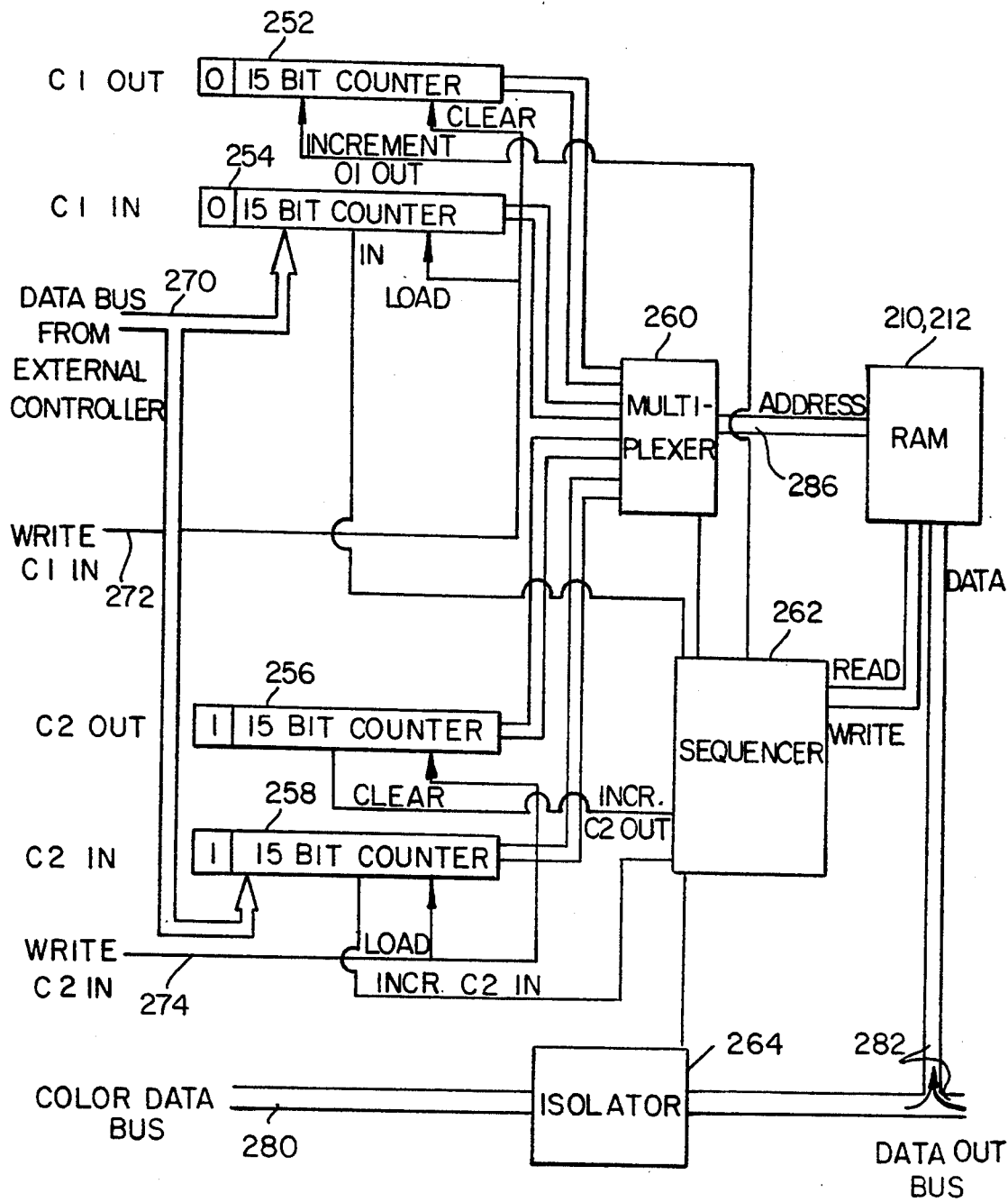
FIG. 15 is an illustration of one specific hardware implementation of the generalized data storage operation shown in FIG. 14.

FIG. 14 is a schematic illustration of the general manner in which color component data from the three linear photosensors 24, 26, 28 are input, stored and output from random access memory (RAM) of a data processor 70. FIG. 15 is an illustration of one specific hardware implementation of the generalized data storage operation shown in FIG. 14.

As illustrated by FIG. 14, a first portion 210 of RAM designated color1 is set aside for temporary storage of data from red sensing photosensor array 24. A second portion 212 of RAM designated color2 is set aside for temporary storage of data from green sensing linear photosensor array 26. In this implementation, the total RAM must have m linearly addressable locations where m is the number of effective scan line widths between the first linear photosensor array 24 and the third linear photosensor array 28 multiplied by the number of pixels per scan line plus the number of effective san line widths between the second linear photosensor array and the third linear photosensor array.

Four RAM "pointers" 222, 224, 226, 228 and 232, 234, 236, 238 are associated with each of the RAM portions 210, 212. The term "pointer" refers to an address in RAM to which data is input or output. Pointer 22 (color1start) describes the start of the RAM space for incoming data from the first (red) linear photosensor 24, i.e. color1. Pointer 24 (color1end) describes the end of the RAM space for color1. Two other pointers 232, 238 (color2start and color2end) describe the beginning and end of the RAM block for data from the green linear photosensor array 26 (color2). By constraining other parts of the system some or all of these pointers can be made implicit in the design rather than actually implemented. For instance, color2start will usually be color1end +1, so it could be replaced with a derivative of color1 end instead of explicitly stored. Likewise, color1start will often be 0 and if the system is so constrained, it can be eliminated. Finally, if the RAM segments are appropriately chosen powers of two, the pointer length (number of bits used to hold the value) can be chosen to allow binary overflows to define the location of the color segments. The other four pointers 224, 226, 234, 236 implement two FIFO (first-in first-out) queues needed to delay the output of red and green color component data from RAM 210, 212 so as to associate the three color component data signals from the same scan lines. These pointers must be loadable, capable of being incremented, and capable of being reset to the beginning of their respective RAM segments. These pointers 224, 226, 234, 236 are referred to as c1out, c1in, c2out, and c2in, respectively.

An external controller, such as the software described above, determines the number of lines of delay desired between color1 and color3 and between color2 and color3. The external controller then sets up the FIFO pointers 224, 226, 234, 236 as follows:

c1out=color1start;

c1in=(color1start+pixels per line * lines between color1 and color3);

c2out=color2start;

c2in=color2start+pixels per line * lines between color2 and color3.

Now, for every incoming set of 3 color values, the following occurs:
1) Store color1 value into location c1in;
2) increment c1in;
3) if c1in>color1end, then c1in<color1start;
4) read and output contents of location c1out;
5) increment c1out;
6) if c1out>color1end, then c1out<color1start;
7) store color2 value into location c2in;
8) increment c2in;
9) if c2in>color2end, then c2in<color2start;
10) read and output contents of location c2out;
11) increment c2out;
12) if c2out>color2end, then c2out<color2start; and
13) output color3 value.

The output of this implementation m is invalid for the first (lines between color1 and color3) lines until the color1delay is over.

One specific implementation of the data storage and transfer scheme of FIG. 14 is shown in FIG. 15. In this arrangement a RAM having 64 k bytes of addressable storage space is provided, thus requiring pointers of 16 bits to uniquely address the required locations. Accordingly, this arrangement includes two pointers 252, 254 associated with c1out and c1in respectively, which include a 15 bit counter for the 15 least significant bits and a binary 0 for the most significant bit. Two other pointers 256, 258 associated with c2in and c2out comprise a 15 bit counter for the 15 least significant bits and a binary 1 for the most significant bit. Output from the counters 252, 254, 256, 258 is provided to RAM 210, 212 through a multiplexer 260 which is in turn operated in accordance with timing signals from a preprogrammed sequencer 262. The sequences also provides timing signals to RAM 210, 212 and to isolator 264 and increments the counters 252, 254, 256, 258 after each photosensor operating interval. A data bus 270 from the external controller is operably connected to counters 254 and 258.

The external controller determines the delay needed between color1 and color3 and loads this value into the pointer c1in. This is done by putting the appropriate value on data bus 270 then strobing control signal writec1in 272. This loads the value on data bus 270 into the counter associated with pointer c1in 254, and since control line write c1in 272 also goes to the "clear" line of the counter associated with pointer c1out 252 it effectively loads a 0 into that counter. The difference between c1in 254 and c1out 252 is now the desired delay between color 1 and color3. The external controller now determines the delay needed between color2 and color3 and loads this value into the counter associated with pointer c2in 258. This is done similarly to loading c1in above, but control line write c2in (274) is used resulting in the difference between c2in 258 and c2out 256 being the desired delay. It should be noted that because pointers c2in 258 and c2out 256 have a 1 for their most significant bits, the address they point to is not the value of their counter but is 32K+ the value of the counter. Since the 15 bit counter of c1in and c1out can only go up to 32K-1 and c2in and c2out are constrained to go between 32K and 64K-1 the locations addressed by the two sets of pointers are mutually exclusive and each color effectively has its own half of RAM.

Now that the external controller has set up the circuit, control is passed to the sequencer which follows the following sequence of events.
1) Isolator 264 is set to connect color data bus 280 to data out bus 282 and multiplexer 260 is set to connect c1in to the rams's address bus 286. The value on the color data bus 280 at this time is the value for color1 from the CCD.
2) Color data is written into ram location pointed to by c1in.
3) C1in is incremented. (Note color1end is 32K and the test for c1in=color1end and if so setting c1in to color1start is implicit in the rollover of the 15 bit counter).
4) Isolator 264 is set to isolate color data bus 280 from the data out bus 282 and multiplexer 260 is set to put pointer c1out on the ram's address bus 286.
5) The ram location pointed to by c1out is now put on the data out bus 282. This is the delayed color1 data.
6) C1out is incremented. (Again counter rollover is used instead of an explicit compare and load.)
7) Isolator 264 is set to connect color data bus 280 to dataout bus 282. The value on the color data bus is now the value for color2 from the CCD. Multiplexer 260 is set to put pointer c2in on the ram's address bus 286.
8) Color data is written into the ram location pointed to by c2in.
9) C2in is incremented. (Again counter rollover takes to place of a compare and a load)
10) Isolator 264 is set to isolate the color data bus 280 from the data out bus 282 and multiplexer 260 is set to put pointer c2out on the ram's address bus.
11) The ram location pointed to by c2out is now put on the data out bus. This is the delayed color2 data.
12) C2out is now incremented. (Again counter rollover is used instead of a compare and a load.)
13) Isolator 264 is now set to connect the color data bus 280 and the data out bus 282. The value on the color data bus 280 is now the value for color 3 from the CCD and this value is passed through without a delay.
14) Repeat the cycle.

Again, as in the general case, a number of lines equal to the longest delay must be clocked through the circuit before meaningful data appears at the output.

It is contemplated that the inventive concepts herein described may be variously otherwise embodied and it is intended that the appended claims be construed to include alternative embodiments of the invention except insofar as limited by the prior art.

APPENDIX A

```
/****************************************************************/
    This is a code fragment demonstrating the software algorithm
for unscrambling an image scanned by a scanner using three
parallel color filters.
    David W. Boyd
    April 29, 1993
    In a complete program, this is where variable declarations
would be followed by some initializations and opening of disk
files.
    .
    .
    .
    At this point in the program, the scrambled input file has been
located and opened. Output files for the three color planes have
been created on the disk, and we're ready to start reading the
scrambled file, unscrambling it, and writing out the aligned red,
green, and blue files.
    First we'll set up three output buffers, one each for red, green
and blue pixels. Each buffer holds one output line of data, and
will be reused for each line of the image.
*/
    rbuff = (char *)malloc(npix);
    gbuff = (char *)malloc(npix);
    bbuff = (char *)malloc(npix);
    rptr = rbuff;
    gptr = gbuff;
    bptr = bbuff;
/*
    Here is where we create the circular buffer in memory. This
needs to hold enough of the image that the red, green, and blue
pixels that go together on the current line are in the buffer at the
same time. In this example, we will shift each color 3 lines to
match it up with the next color.
*/
    shift_lines = 3;
    shift_buff = (char *)malloc(shift_lines*npix*2*3);
/*
    Now read enough of the input imaged to fill the circular
    buffer.
*/
    read(ifileno,shift_buff,shift_lines*npix*2*3);
/*
    This is where the main loop starts. For each line in the image,
we'll copy the red pixels from the circular buffer into the red
output buffer. Then we'll copy the green pixels from the circular
buffer into the green output buffer. Then we'll read a new line of
scrambled data into the circular buffer and copy the blue pixels
from it into the blue output buffer. Finally, we'll write the
three output buffers to the files.
*/
    for (i=0;i<nlines;i++)
    {
        /* calculate where the proper red pixels are in the circular
        buffer for this line */
        iptr = shift_buff + (i % (2*shift_lines))*npix*3 +2;
        /* copy the red pixels to the red output buffer */
        for (j=0;j<npix;j++)
        {
            *rptr++ = *iptr;
            iptr += 3;
        }
        /* calculate where the proper green pixels are in the circular
        buffer for this line */
        iptr = shift_buff + ((i + shift_lines) % (2*shift_lines))*npix*3
+ 1;
        /* copy the green pixels to the green output buffer */
        for (j=0;j<npix;j++)
        {
            *gptr++ = *iptr;
            iptr += 3;
        }
        /* calculate where in the circular buffer this line's blue pixels
        should go */
        iptr = shift_buff + (i % (2*shift_lines))*npix*3;
        /* read the next line of scrambled data */
        read(ifileno,iptr,npix*3);
        /* copy the blue pixels from it to the blue output buffer */
        for (j=0;j<npix;j++)
        {
            *bptr++ = *iptr;
            iptr += 3;
        }
```

APPENDIX A-continued

```
        /* write the output buffers out to the files of unscrambled
        data */
        write (rfileno,rbuff,npix);
        write (gfileno,gbuff,npix);
        write (bfileno,bbuff,npix);
        rptr = rbuff;
        gptr = gbuff;
        bptr = bbuff;
    }
/*
    That's the end of the main loop. After this point, the program
closes all the files and terminates.
*/
```

What is claimed is:

1. An optical scanner device for producing machine-readable data representative of a color image of a scanned object comprising:
   a) light source means for illuminating said object;
   b) imaging means for focusing imaging light from an aligned portion of said object onto an image region for providing an image of said aligned portion of said object at said image region;
   c) a photosensor assembly operable in successive sampling intervals for generating image data representative of a color image of said object comprising:
      i) a first linear photosensor means located in said image region and having a predetermined photosensor line width for generating a first data signal representative of the intensity of imaging light impinged thereon; and
      ii) a second linear photosensor means located in said image region and having said predetermined photosensor line width for generating a second data signal representative of the intensity of imaging light impinged thereon, said second linear photosensor means being positioned parallel to said first linear photosensor means and spaced therefrom by a first photosensor gap distance;
   d) first and second color filter means operatively associated with said first and second linear photosensor means respectively for filtering imaging light focused on said linear photosensor means whereby said first photosensor means receives only light of a first preselected color and said second photosensor means receives only light of a second preselected color;
   e) displacement means for producing relative displacement between said object and said imaging means for producing a sweeping scan image of said object in said image region;
   f) scan speed indicating means for generating a scan speed signal indicating a selected one of different scan speeds of said displacement means;
   g) data processing means responsive to said scan speed signal for correlating data from said first data signal with data from said second data signal such that the correlated data are representative of the intensity of light from the same general location on said object regardless of the selected scan speed.

2. The invention of claim 1, said data processing means comprising:
   a) means for storing a reference-line-number value representative of said first photosensor gap distance divided by said predetermined photosensor line width;

ii) means for storing a reference-scan-speed value representative of a scan speed at which the rate of sweeping displacement of the scan image over the image region is equal to said predetermined photosensor line width divided by the duration of a photosensor sampling interval;

iii) means for processing said signal from said scan speed selection means for determining a current scan speed value;

iv) means for dividing said reference-scan-speed value by said current scan speed value and for multiplying the result by said reference-line-number value for determining a sampling-interval-offset-number.

3. The invention of claim 2 wherein said data processing means comprises:

first storage means for orderly storing data from said first data signal after each sampling interval in a manner indicative of the sampling interval during which the data was collected;

second storage means for orderly storing data from said second data signal after each sampling interval in a manner indicative of the sampling interval during which the data was collected;

means for correlating data stored in said first data storage means after each sampling interval with data which is stored in said second data storage means a predetermined number of sampling intervals later; said predetermined number of sampling intervals later being equal to said sampling-interval-offset-number.

4. The invention of claim 1, further comprising:

a) a third linear photosensor means located in said image region and having a line width equal to said predetermined photosensor line width for generating a third data signal representative of the intensity of imaging light impinged thereon, said third linear photosensor means being positioned parallel to said second linear photosensor means and spaced therefrom by a second photosensor gap distance;

b) third color filter means operatively associated with said third linear photosensor means for filtering imaging light focused on said third linear photosensor means whereby it receives only light of a third preselected color;

and wherein said data processing means is responsive to said scan speed signal for correlating data from said first data signal with data from said second data signal and said third data signal such that the correlated data are all representative of the intensity of light from the same location on the object regardless of the selected scan speed.

5. The invention of claim 4, said data processing means comprising:

a) means for storing a first reference-line-number value representative of said first photosensor gap distance divided by said predetermined photosensor line width;

b) means for storing a reference-scan-speed value representative of a scan speed at which the rate of sweeping displacement of the scan image over the image region is equal to said predetermined photosensor line width divided by the duration of a photosensor sampling interval;

c) means for processing said signal from said scan speed selection means for determining a current scan speed value;

d) means for dividing said reference-scan-speed value by said current scan speed value and for multiplying the result by said first reference-line-number for determining a first sampling-interval-offset-number;

e) means for storing a second reference-line-number value representative of said second photosensor gap distance divided by said predetermined photosensor line width;

f) means for dividing said current scan speed value by said reference-scan-speed value and for multiplying the result by said second reference-line-number for determining a second sampling-interval-offset-number.

6. The invention of claim 5 wherein said data processing means comprises:

first storage means for orderly storing data from said first data signal after each sampling interval in a manner indicative of the sampling interval during which the data was collected;

second storage means for orderly storing data from said second data signal after each sampling interval in a manner indicative of the sampling interval during which the data was collected;

third storage means for orderly storing data from said third data signal after each sampling interval in a manner indicative of the sampling interval during which the data was collected;

means for correlating data stored in said first data storage means after each sampling interval with data which is stored in said second data storage means a first predetermined number of sampling intervals later and for correlating data stored in said first data storage means after each sampling interval with data which is stored in said third data storage means a second predetermined number of sampling intervals later; said first predetermined number of sampling intervals later being equal to said first sampling-interval-offset-number; said second predetermined number of sampling intervals later being equal to said first sampling-interval-offset-number plus said second sampling-interval-offset-number.

7. The invention of claim 1, each of said linear photosensor arrays comprising CCD arrays.

8. The invention of claim 4, each of said linear photosensor arrays comprising CCD arrays.

9. The invention of claim 8, said first, second and third color filter means comprising red, green, and blue color filters.

10. A method of correlating image data generated by a first and a second linear photosensor array of a color optical scanner which each have a different color filters associated therewith and which each have the same photosensor sampling interval and which each have the same predetermined photosensor width and which are separated by a predetermined photosensor gap distance and wherein both linear photosensor arrays are located in an image region upon which a polychromatic scan image of an object is projected, comprising the steps of:

a) determining the scan speed of the optical scanner;

b) correlating data from the first linear photosensor array with data from the second linear photosensor array as a function of the scan speed, such that each correlated set of data is representative of the intensity of light from the same location on the object regardless of the scan speed of the scanner.

11. The method of claim 10 wherein correlating data comprises:

a) calculating a reference-line-number value representative of the predetermined photosensor gap distance divided by the predetermined photosensor line width;
b) calculating a reference-scan-speed value representative of a scan speed at which the rate of displacement of the scan image over the image region is equal to the predetermined photosensor line width divided by the duration of a photosensor sampling interval;
c) dividing the reference-scan-speed value by the current scan speed value and multiplying the result by the reference-line- number value for determining a sampling-interval-offset-number.

12. The method of claim 11 wherein correlating data further comprises:
a) orderly storing data sets from the first sensor array after each sampling interval in a manner indicative of the sampling interval during which the data was collected;
b) orderly storing data sets from the second sensor array after each sampling interval in a manner indicative of the sampling interval during which the data was collected;
c) correlating stored data sets from the first sensor array with stored data sets from the second sensor array which was stored a sampling-interval-offset-number of sampling intervals later than the data sets from the first sensor array.

13. The invention of claim 10 comprising the further step of using the correlated data from the first and second linear photosensor arrays to generate a display image of the object.

14. The invention of claim 12 comprising the further step of storing the correlated data on a data storage medium.

* * * * *